(12) United States Patent
Schultz et al.

(10) Patent No.: US 8,397,974 B2
(45) Date of Patent: Mar. 19, 2013

(54) SELF-REACTING FRICTION STIR WELDING TOOL WITH THE ABILITY TO ADD FILLER MATERIAL

(75) Inventors: Jeffrey Patrick Schultz, Blacksburg, VA (US); Kevin Creehan, Blacksburg, VA (US)

(73) Assignee: Aeroprobe Corporation, Blacksburg, VA (US)

( * ) Notice: Subject to any disclaimer, the term of this patent is extended or adjusted under 35 U.S.C. 154(b) by 0 days.

(21) Appl. No.: 13/442,285

(22) Filed: Apr. 9, 2012

(65) Prior Publication Data

US 2012/0279442 A1 Nov. 8, 2012

Related U.S. Application Data

(63) Continuation-in-part of application No. 12/792,655, filed on Jun. 2, 2010, which is a continuation-in-part of application No. 11/527,149, filed on Sep. 26, 2006, now abandoned, application No. 13/442,285, which is a continuation-in-part of application No. 12/987,588, filed on Jan. 10, 2011.

(Continued)

(51) Int. Cl.
*B23K 20/12* (2006.01)
(52) U.S. Cl. ..................... 228/2.1; 228/112.1
(58) Field of Classification Search ............. 228/2.1, 228/112.1
See application file for complete search history.

(56) References Cited

U.S. PATENT DOCUMENTS

| 3,217,957 A | 11/1965 | Jarvie et al. |
| 3,279,971 A | 10/1966 | Gardener |
| 3,292,838 A | 12/1966 | Farley |
| 3,418,196 A | 12/1968 | Luc |
| 3,444,611 A | 5/1969 | Bogart |
| 3,455,015 A | 7/1969 | Henricus et al. |
| 3,466,737 A | 9/1969 | Hanink |
| 3,495,321 A | 2/1970 | Shaff |
| 3,537,172 A | 11/1970 | Voznesensky et al. |
| 3,831,262 A | 8/1974 | Luc |
| 3,899,377 A | 8/1975 | Luc |
| 3,949,896 A | 4/1976 | Luc |

(Continued)

FOREIGN PATENT DOCUMENTS

| GB | 572789 A | 10/1945 |
| GB | 1224891 A | 3/1971 |

(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.

(Continued)

*Primary Examiner* — Kevin P Kerns
*Assistant Examiner* — Kevin E Yoon
(74) *Attorney, Agent, or Firm* — New River Valley IP Law; Michele L. Mayberry

(57) ABSTRACT

The present invention relates to tools and methods for welding, coating, repairing, or otherwise modifying the surface of a metal substrate. More specifically, embodiments of the present invention provide self-reacting friction stir welding tools which have an internal channel that allows filler materials to be added to the weld joint or otherwise friction stir processed area. Embodiments also provide friction stir tooling having upper and lower shoulders disposed at a fixed distance from one another and connected by a fixed split-pin. The tooling can be configured for automatically dispensing varying amounts of filler material into the tooling in response to variations in thickness of a substrate being processed.

12 Claims, 6 Drawing Sheets

Additional schematics of self-reacting stirring tool with filler materials.

Related U.S. Application Data

(60) Provisional application No. 60/720,521, filed on Sep. 26, 2005, provisional application No. 61/293,543, filed on Jan. 8, 2010, provisional application No. 61/472,918, filed on Apr. 7, 2011, provisional application No. 61/472,928, filed on Apr. 7, 2011, provisional application No. 61/473,221, filed on Apr. 8, 2011.

(56) References Cited

U.S. PATENT DOCUMENTS

| | | | |
|---|---|---|---|
| 4,106,167 | A | 8/1978 | Luc |
| 4,144,110 | A | 3/1979 | Luc |
| 4,491,001 | A | 1/1985 | Yoshida et al. |
| 4,959,241 | A | 9/1990 | Thomas et al. |
| 5,056,971 | A | 10/1991 | Sartori |
| 5,249,778 | A | 10/1993 | Steichert et al. |
| 5,262,123 | A | 11/1993 | Thomas et al. |
| 5,330,160 | A | 7/1994 | Eisermann et al. |
| 5,460,317 | A | 10/1995 | Thomas et al. |
| 5,469,617 | A | 11/1995 | Thomas et al. |
| 5,611,479 | A | 3/1997 | Rosen |
| 5,637,836 | A | 6/1997 | Nakagawa et al. |
| 5,697,511 | A | 12/1997 | Bampton |
| 5,697,544 | A | 12/1997 | Wykes |
| 5,713,507 | A | 2/1998 | Holt et al. |
| 5,718,366 | A | 2/1998 | Colligan |
| 5,769,306 | A | 6/1998 | Colligan |
| 5,794,835 | A | 8/1998 | Colligan et al. |
| 5,813,592 | A | 9/1998 | Midling et al. |
| 5,826,664 | A | 10/1998 | Richardson |
| 5,893,507 | A | 4/1999 | Ding et al. |
| 5,971,247 | A | 10/1999 | Gentry |
| 5,971,252 | A | 10/1999 | Rosen et al. |
| 5,975,406 | A | 11/1999 | Mahoney et al. |
| 6,029,879 | A | 2/2000 | Cocks |
| 6,045,027 | A | 4/2000 | Rosen et al. |
| 6,045,028 | A | 4/2000 | Martin et al. |
| 6,050,474 | A | 4/2000 | Aota et al. |
| 6,050,475 | A | 4/2000 | Kinton et al. |
| 6,051,325 | A | 4/2000 | Talwar et al. |
| 6,053,391 | A | 4/2000 | Heideman et al. |
| 6,070,784 | A | 6/2000 | Holt et al. |
| 6,119,624 | A | 9/2000 | Morikawa et al. |
| 6,138,895 | A | 10/2000 | Oelgoetz et al. |
| 6,168,066 | B1 | 1/2001 | Arbegast |
| 6,168,067 | B1 | 1/2001 | Waldron et al. |
| 6,173,880 | B1 | 1/2001 | Ding et al. |
| 6,193,137 | B1 | 2/2001 | Ezumi et al. |
| 6,199,745 | B1 | 3/2001 | Campbell et al. |
| 6,206,268 | B1 | 3/2001 | Mahoney |
| 6,213,379 | B1 | 4/2001 | Takeshita et al. |
| 6,227,430 | B1 | 5/2001 | Rosen et al. |
| 6,230,957 | B1 | 5/2001 | Arbegast et al. |
| 6,237,829 | B1 | 5/2001 | Aota et al. |
| 6,237,835 | B1 | 5/2001 | Litwinski et al. |
| 6,247,633 | B1 | 6/2001 | White et al. |
| 6,247,634 | B1 | 6/2001 | Whitehouse |
| 6,250,037 | B1 | 6/2001 | Ezumi et al. |
| 6,257,479 | B1 | 7/2001 | Litwinski et al. |
| 6,259,052 | B1 | 7/2001 | Ding et al. |
| 6,264,088 | B1 | 7/2001 | Larsson |
| 6,273,323 | B1 | 8/2001 | Ezumi et al. |
| 6,276,591 | B1 | 8/2001 | Kawasaki et al. |
| 6,290,117 | B1 | 9/2001 | Kawasaki et al. |
| 6,299,048 | B1 | 10/2001 | Larsson |
| 6,299,050 | B1 | 10/2001 | Okamura et al. |
| 6,302,315 | B1 | 10/2001 | Thompson |
| 6,305,866 | B1 | 10/2001 | Aota et al. |
| 6,311,889 | B1 | 11/2001 | Ezumi et al. |
| 6,315,187 | B1 | 11/2001 | Satou et al. |
| 6,321,975 | B1 | 11/2001 | Kawasaki et al. |
| 6,325,273 | B1 | 12/2001 | Boon et al. |
| 6,328,261 | B1 | 12/2001 | Wollaston et al. |
| 6,352,193 | B1 | 3/2002 | Bellino et al. |
| 6,354,483 | B1 | 3/2002 | Ezumi et al. |
| 6,360,937 | B1 | 3/2002 | De Koning |
| 6,364,197 | B1 | 4/2002 | Oelgoetz et al. |
| 6,367,681 | B1 | 4/2002 | Waldron et al. |
| 6,378,264 | B1 | 4/2002 | Kawasaki et al. |
| 6,378,754 | B2 | 4/2002 | Aota et al. |
| 6,382,498 | B2 | 5/2002 | Aota et al. |
| 6,386,425 | B2 | 5/2002 | Kawasaki et al. |
| 6,398,883 | B1 | 6/2002 | Forrest et al. |
| 6,413,610 | B1 | 7/2002 | Nakamura et al. |
| 6,419,142 | B1 | 7/2002 | Larsson |
| 6,419,144 | B2 | 7/2002 | Aota |
| 6,421,578 | B1 | 7/2002 | Adams et al. |
| 6,422,449 | B1 | 7/2002 | Ezumi et al. |
| 6,450,394 | B1 | 9/2002 | Wollaston et al. |
| 6,450,395 | B1 | 9/2002 | Weeks et al. |
| 6,457,629 | B1 | 10/2002 | White |
| 6,460,752 | B1 | 10/2002 | Waldron et al. |
| 6,461,072 | B2 | 10/2002 | Kawasaki et al. |
| 6,464,127 | B2 | 10/2002 | Litwinski et al. |
| 6,471,112 | B2 | 10/2002 | Satou et al. |
| 6,474,533 | B1 | 11/2002 | Ezumi et al. |
| 6,484,924 | B1 | 11/2002 | Forrest |
| 6,494,011 | B2 | 12/2002 | Ezumi et al. |
| 6,497,355 | B1 | 12/2002 | Ding et al. |
| 6,499,649 | B2 | 12/2002 | Sayama et al. |
| 6,502,739 | B2 | 1/2003 | Ezumi et al. |
| 6,513,698 | B2 | 2/2003 | Ezumi et al. |
| 6,516,992 | B1 | 2/2003 | Colligan |
| 6,527,470 | B2 | 3/2003 | Ezumi et al. |
| 6,543,671 | B2 | 4/2003 | Hatten et al. |
| 6,572,007 | B1 | 6/2003 | Stevenson et al. |
| 6,648,206 | B2 | 11/2003 | Nelson et al. |
| 6,669,075 | B2 | 12/2003 | Colligan |
| 6,722,556 | B2 | 4/2004 | Schilling et al. |
| 6,732,901 | B2 | 5/2004 | Nelson et al. |
| 6,745,929 | B1 | 6/2004 | Ezumi et al. |
| 6,758,382 | B1 * | 7/2004 | Carter .................. 228/2.1 |
| 6,779,704 | B2 | 8/2004 | Nelson et al. |
| 6,866,181 | B2 | 3/2005 | Aota et al. |
| 6,953,140 | B2 | 10/2005 | Park et al. |
| 7,036,708 | B2 | 5/2006 | Park et al. |
| 7,066,375 | B2 | 6/2006 | Bolser |
| 7,124,929 | B2 | 10/2006 | Nelson et al. |
| 7,152,776 | B2 | 12/2006 | Nelson et al. |
| 7,156,276 | B2 | 1/2007 | Slattery |
| 7,163,136 | B2 * | 1/2007 | Hempstead et al. .......... 228/2.1 |
| 7,597,236 | B2 * | 10/2009 | Tolle et al. ................. 228/112.1 |
| 7,608,296 | B2 | 10/2009 | Packer et al. |
| 7,624,910 | B2 | 12/2009 | Barnes et al. |
| 7,661,572 | B2 | 2/2010 | Nelson et al. |
| 2002/0011509 | A1 | 1/2002 | Nelson et al. |
| 2002/0014516 | A1 | 2/2002 | Nelson et al. |
| 2002/0168466 | A1 | 11/2002 | Tapphorn et al. |
| 2002/0179682 | A1 | 12/2002 | Schilling et al. |
| 2003/0010805 | A1 | 1/2003 | Nelson et al. |
| 2003/0075584 | A1 | 4/2003 | Sarik et al. |
| 2004/0118899 | A1 | 6/2004 | Aota et al. |
| 2004/0134972 | A1 | 7/2004 | Nelson et al. |
| 2004/0155093 | A1 | 8/2004 | Nelson et al. |
| 2004/0265503 | A1 | 12/2004 | Clayton et al. |
| 2005/0006439 | A1 | 1/2005 | Packer et al. |
| 2005/0045695 | A1 | 3/2005 | Subramanian et al. |
| 2005/0051599 | A1 | 3/2005 | Park et al. |
| 2005/0060888 | A1 | 3/2005 | Park et al. |
| 2005/0127139 | A1 | 6/2005 | Slattery et al. |
| 2005/0210820 | A1 | 9/2005 | Tanaka et al. |
| 2005/0242158 | A1 | 11/2005 | Bolser |
| 2006/0016854 | A1 | 1/2006 | Slattery |
| 2006/0060635 | A1 | 3/2006 | Slattery et al. |
| 2006/0096740 | A1 | 5/2006 | Zheng |
| 2006/0208034 | A1 | 9/2006 | Packer et al. |
| 2007/0040006 | A1 | 2/2007 | Charles et al. |
| 2007/0075121 | A1 | 4/2007 | Slattery |
| 2007/0102492 | A1 | 5/2007 | Nelson et al. |
| 2007/0138236 | A1 | 6/2007 | Agarwal et al. |
| 2007/0187465 | A1 | 8/2007 | Eyre et al. |
| 2007/0241164 | A1 | 10/2007 | Barnes et al. |
| 2007/0297935 | A1 | 12/2007 | Langan et al. |
| 2008/0041921 | A1 | 2/2008 | Creehan et al. |

| | | |
|---|---|---|
| 2009/0188101 A1 | 7/2009 | Durandet et al. |
| 2009/0258232 A1 | 10/2009 | Brice |
| 2010/0089976 A1 | 4/2010 | Szymanski et al. |
| 2010/0089977 A1 | 4/2010 | Chen et al. |
| 2010/0146866 A1 | 6/2010 | Nelson et al. |
| 2010/0258612 A1 | 10/2010 | Kolbeck et al. |

FOREIGN PATENT DOCUMENTS

| | | |
|---|---|---|
| GB | 2270864 A | 3/1994 |
| GB | 2306366 A | 5/1997 |
| JP | 11267857 A | 10/1999 |
| RU | 1393566 | 5/1988 |

OTHER PUBLICATIONS

Friction Stir Tooling: Tool Materials and Designs, Chapter 2 in Friction Stir Welding and Processing, pp. 7-35, ASM International, Editors Rajiv S. Mishra & Murray W. Mahoney, 2007.

Metal-Matrix Composites (ASM Metals Handbook Online, ASM International, 2002), Introduction, Aluminum-Matrix Composites.

* cited by examiner

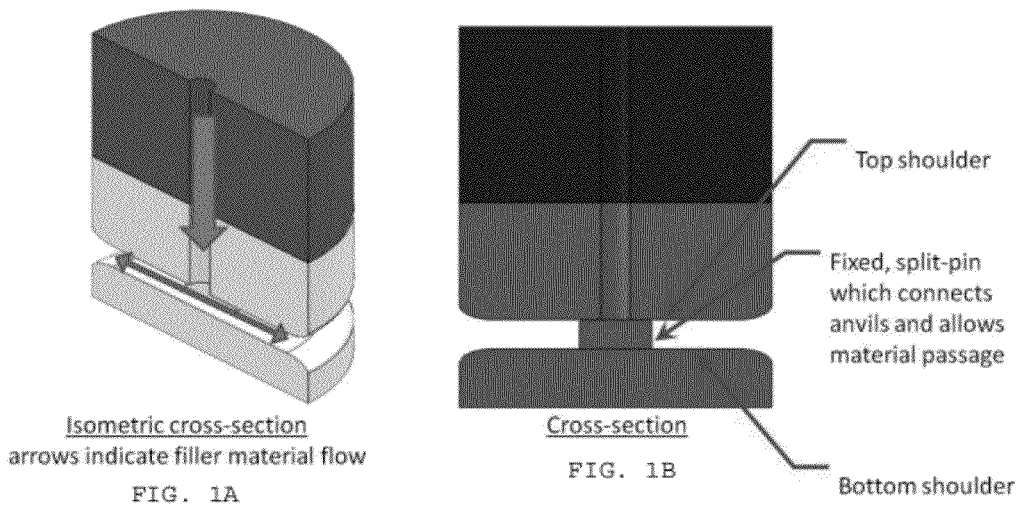
Cross-sectional and isometric schematics of self-reacting stirring tool with filler materials.
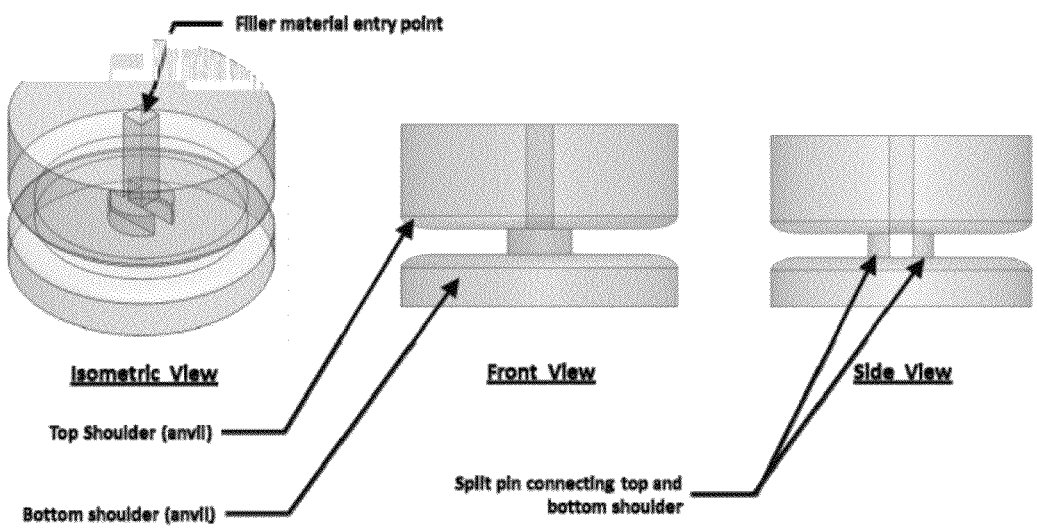
Additional schematics of self-reacting stirring tool with filler materials.

Standard self-reacting friction stir welding (SRFSW) tool which requires relative motion of the shoulders to operate correctly.

Schematic of continuous feeding system with self-reacting tool.

Self-reacting tool with filler can be used to increase the weld thickness above that of the base plate and also minimizes load in the z-axis.

Exemplary auger screws (not exhaustive)

Example of continuous feed system with conical auger screw and self-reacting stirring tool

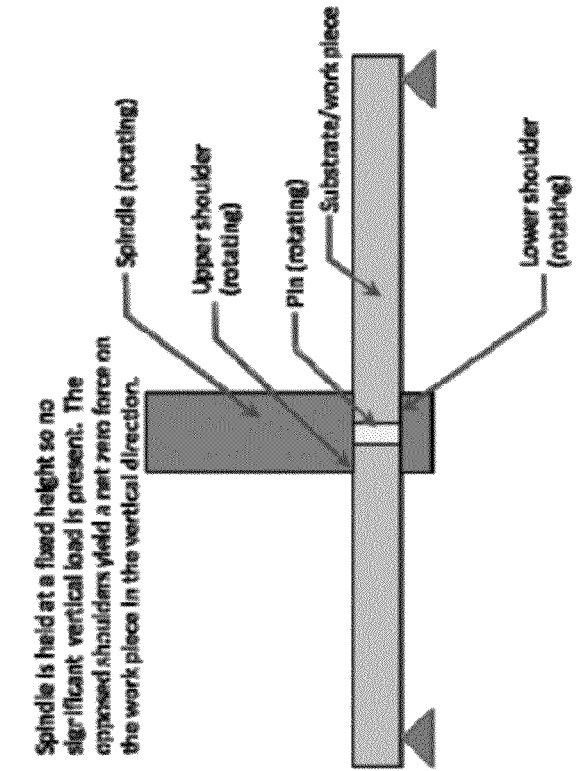
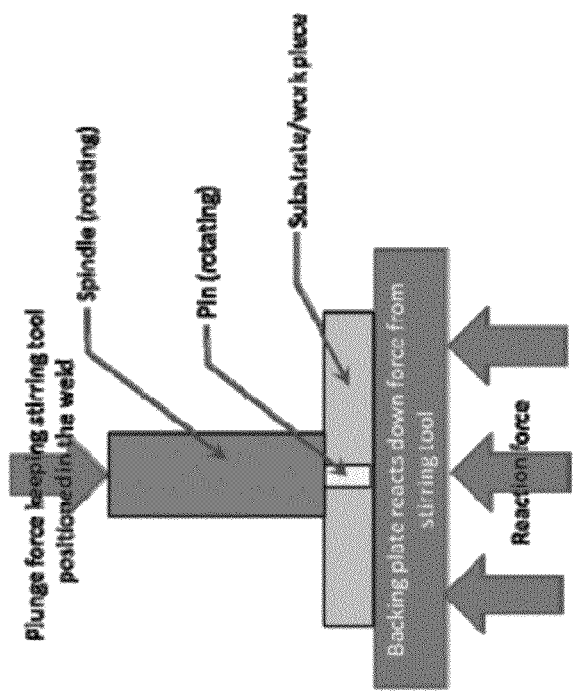
FIG. 6

SELF-REACTING FRICTION STIR WELDING TOOL WITH THE ABILITY TO ADD FILLER MATERIAL

CROSS-REFERENCE TO RELATED APPLICATIONS

This application is a Continuation-in-Part (CIP) application of U.S. application Ser. No. 12/792,655, filed on Jun. 2, 2010, which is a CIP of U.S. application Ser. No. 11/527,149, filed on Sep. 26, 2006, which claims priority to and the benefit of the filing date of U.S. Provisional Application No. 60/720,521, filed Sep. 26, 2005; and this application is a CIP of U.S. application Ser. No. 12/987,588, filed Jan. 10, 2011, which claims priority to and the benefit of the filing date of U.S. Provisional Application No. 61/293,543, filed Jan. 8, 2010; and this application claims priority to and the benefit of the filing date of U.S. Provisional Application Nos. 61/472,918 and 61/472,928, filed Apr. 7, 2011, and U.S. Provisional Application No. 61/473,221, filed Apr. 8, 2011, the disclosures of each of which is hereby incorporated by reference herein in their entireties.

STATEMENT OF GOVERNMENT INTEREST

This invention was supported by the U.S. Office of Naval Research under Contract No. N00014-05-1-0099. The U.S. Government has certain rights in this invention.

BACKGROUND OF THE INVENTION

1. Field of the Invention

The present invention relates to tools and methods for welding, coating, repairing, or otherwise modifying the surface of a metal substrate. More specifically, and as shown in FIGS. 1A-B, the present invention relates to self-reacting friction stir welding tools which have an internal channel that allows filler materials to be added to the weld joint or otherwise friction stir processed area.

2. Description of Related Art

Friction stir welding (FSW) is a solid-state welding process in which a rotating non-consumable tool consisting of a cylindrical shoulder with a pin protruding from the bottom translates along the weld axis, and as the tool rotates and translates the base metal is heated and plastically deformed mixing metal from the two plates together. Exemplary publications relating to friction stir welding include European Patent Nos. 0 615 480 B1, and 0 752 926 B1, the disclosures of which are incorporated by reference herein in their entireties.

In a typical FSW Implementation, a backing anvil is located under/behind the workpieces being joined to support the workpieces and react to the load imparted by the tool. To maximize strength of the joint between workpiece sections, the welded portion should extend the entire thickness of the workpiece and the plasticized region should extend between upper and lower surfaces of the workpiece.

Due to variations in thickness of workpieces, the depth of the pin penetration into the joint can vary. If pin depth does not extend sufficiently into the joint, the plasticized region may not extend the entire thickness of the workpiece, which may lead to stress notches in the joint. Likewise, for variations to smaller thicknesses, the pin can extend too close to the backplate so that the workpiece becomes joined to the backplate during welding.

Self-reacting friction stir welding (SRFSW) tools, such as U.S. Pat. No. 6,199,745, the disclosure of which is incorporated by reference herein in its entirety, eliminate the need for a backing anvil and as such are an ideal tool choice for FSW where backside access is restricted such as in ship yard assembly of prefabricated panels. This patent describes a welding head including upper and lower probe members and probe pin, where the upper and lower probe members are independently actuatable and biased to follow the profile of a workpiece and supply a balance load to opposed surfaces of a workpiece during welding operation. Shown in FIG. 2 is an example of a typical self-reacting type tool.

A major drawback of SRFSW type tools are the added complexity of requiring movable shoulders to increase or decrease the spacing between the shoulders depending on the thickness of the plate being welded. Additionally, variation in the thicknesses of plates being welded can lead to under and/or over penetration of the shoulder thus thinning the weld on the thick side and loss of shoulder contact on the thin side.

To address some of these manufacturing difficulties, the present inventors have proposed a novel self-reacting stirring tool with no relative movement between shoulders and in operable communication with a system for continuously feeding filler material to the tool.

SUMMARY OF THE INVENTION

Embodiments of the present invention provide a solid-state wrought metal joining process which uses shear-induced interfacial heating and plastic deformation to coat and join metals. Using these state-of-the-art techniques it is possible to produce high-strength coatings, welds, and structures (strengths comparable to the base metal UTS), while retaining a wrought microstructure. The inventive structures exhibit superior qualities compared to structures having a solidification microstructure (i.e. cast microstructure). Benefits of the invention include the capability of creating substrates with little to no porosity, a typical undesirable result of parts prepared using molds.

In this process, filler material is deposited through a rotating spindle to the substrate surface or joint. Frictional heating occurs at the filler/substrate interface due to the rotational motion of the filler material and the downward force applied. The mechanical shearing that occurs at the interface acts to disperse any oxides or boundary layers, resulting in a metallurgical bond between the substrate(s) and filler material. As the substrate moves, the filler material is extruded under the rotating shoulder of the stirring tool. To repair/rehabilitate cracked, sensitized, or otherwise defective or damaged substrates, a self-reacting tool with filler material is provided for processing areas where a backing anvil is not practical or possible.

Provided by the invention is a self-reacting friction stir welding system comprising: friction stir-based fabrication tooling; and a fluidized powder delivery system or a solid feedstock delivery system in operable communication therewith; wherein the material delivery system automatically dispenses varying amounts of filler material into the tooling in response to variations in thickness of a substrate being processed or a variation in the gap between substrates being joined.

Methods within the scope of the invention, and tools for performing such methods, include: depositing a coating on a substrate by way of frictional heating and compressive loading of a coating material against the substrate; continuously delivering the coating material through a stirring tool in response to variations in thickness of a substrate being processed or a variation in the gap between substrates being joined; and forming and shearing a surface of the coating on the substrate. The feed material or coating material can be fed through the spindle non-continuously, semi-continuously, or preferably continuously. Such methods and tools include use of tools comprising opposing shoulders for forming and shearing a surface of the coating or weld.

Such systems can comprise a thickness gauge for determining substrate thickness and a control system for varying the amount of filler material dispensed in response to changes in thickness or gap width.

In embodiments, a coating material is deposited on a substrate using frictional heating and compressive loading of the coating material against the substrate. The coating material is a consumable material, meaning as frictional heating and compressive loading are applied during the process, the coating material is consumed from its original form and is applied to the substrate. For continuous-feed applications, it is preferred that the feed material be in the form of a powder or pellet. More particularly, as the applied load is increased, beyond what would be required to join the consumable coating material to the substrate, and the portion of the coating material adjacent to the substrate is caused to deform under the compressive load. In preferred embodiments, the deformed metal is then trapped below a rotating shoulder of the friction-based coating tool and then sheared across the substrate surface as the substrate translates and rotates relative to the tool.

The self-reacting type tooling of the inventive systems can comprise an upper shoulder and a lower shoulder disposed at a fixed distance with their surfaces facing one another. More particularly, in embodiments, systems of the invention can comprise: a non-consumable body with a throat and upper and lower shoulder surfaces; a screw-type auger for continuously delivering powder-type coating or filler material in and through the throat of the tool body; one or more means for rotating the tool body at a desired first velocity and for rotating the auger at desired second and different velocity; and wherein the upper shoulder surface and the lower shoulder surface are capable of trapping filler material loaded into the substrate in a volume between the tool shoulders and are capable of joining the substrates with frictional heating and compressive/shear loading. Translation of the tooling relative to the substrate(s) can provide for a region of the substrate(s) to be repaired or coated.

Welding methods are also within the scope of the invention, including methods of welding which use the self-reacting tooling described in this application. Also included within the scope of the invention are methods, systems and devices for joining two or more metal parts with no discrete or discernible interface between the weld and the parts.

Provided by embodiments is a self-reacting stirring tool which has an internal channel that allows filler materials to be added to the weld joint or otherwise friction stir processed area. For example, such self-reacting tooling can comprise a throat surface, which is a hollow cylinder disposed lengthwise through the tool body. In the context of this specification, what is meant by "self-reacting" is that the z-load imparted by the top shoulder of the stirring tool is reacted by the bottom shoulder thus there is a net zero load on the plates in the axis parallel to the spindle rotation (z-axis).

Other specific embodiments include friction-based fabrication tools comprising: (a) a self-reacting spindle member comprising a hollow interior for housing a coating material disposed therein prior to deposition on a substrate; (b) means for dispensing coating material through the throat of the tool; (c) means for compressive loading of the coating material from the spindle onto the substrate; and (d) means for rotating and translating the spindle relative to the substrate; wherein the spindle comprises shoulder surfaces with a flat surface geometry and operably configured for trapping the loaded coating material in a volume between the shoulder and the substrate and for forming and shearing a surface of a coating on the substrate. In preferred embodiments, one means for dispensing coating material through the throat of the tool is an auger shaped member disposed lengthwise in the throat and operably configured for pushing powdered coating material through the tool throat.

Such tooling, in contrast to existing SRFSW tooling, does not require movable shoulders because filler metal can be added to increase the weld thickness to fill the gap between the shoulders when the tooling encounters an area of the substrate where the thickness varies or the gap between the substrates changes.

BRIEF DESCRIPTION OF THE DRAWINGS

The accompanying drawings illustrate certain aspects of some embodiments of the present invention, and should not be used to limit or define the invention. Together with the written description the drawings serve to explain certain principles of the invention.

FIGS. 1A-C are schematic diagrams illustrating a representative self reacting stirring tool, shown in an isometric view (FIG. 1A), a cross-sectional view (FIG. 1B), and additional views (FIG. 1C) configured to deliver filler material through the throat of the tooling.

FIG. 6 is a schematic diagram illustrating forces present with typical self-reacting type tooling in contrast to that of the invention.

DETAILED DESCRIPTION OF VARIOUS EMBOIDMENTS OF THE INVENTION

Figure 2:
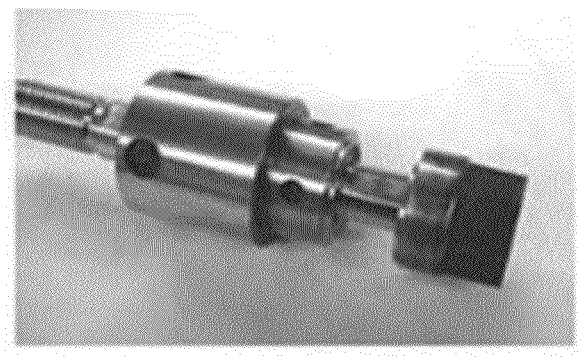
FIG. 2 is a photograph of a prior art Friction Stir Welding (FSW) tool.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As shown in FIGS. 1A-B, consumable feed material can be introduced into the spindle of a non-consumable tool body. In embodiments, the consumable material can be transported through a channel or passageway disposed lengthwise through the tool body as indicated by the vertical arrow in FIG. 1A. This passageway or throat is generally in the form of a hollow cylinder or other similar shape to reduce drag or interference between particles passing through the channel and the walls of the channel. The throat can be the same diameter throughout the length of the tool body or the diameter can be larger at the opening of the tool (where consumable material is introduced to the spindle) and draw gently or rapidly smaller at the opposing end of the channel (where the filler material exits the tool). In preferred embodiments the channel has one diameter at the opening, a second smaller diameter at the exit and a transitional portion in between with a varying or narrowing diameter to join the upper and lower portions of the channel.

In embodiments, feed material can be fed into and through the tool in the same manner as described in any of the prior or simultaneous disclosures of the inventors, including, for example, U.S. application Ser. Nos. 13/442,201, 12/792,655 and 11/527,149, which provide various details about aspects of embodiments of friction stir fabrication tools, the disclosures of which are incorporated by reference herein in their entireties. As shown in FIG. 1A, to flow into the weld nugget, feed material flows normal to the initial feeding direction (indicated by horizontal arrows in FIG. 1A).

Embodiments provide self-reacting friction stir welding tooling comprising: friction fabrication tooling having a non-consumable body with a throat and upper and lower shoulder surfaces disposed at a fixed distance with their surfaces facing one another; wherein the upper shoulder surface and the lower shoulder surface are capable of trapping filler material loaded into the substrate in a volume between the tool shoulders and are capable joining the substrates with frictional heating and compressive/shear loading.

To maintain a fixed distance between the opposing shoulders, the tooling can be operably configured such that the upper and lower shoulders are connected by a fixed split-pin. For example, and as shown in FIG. 1B, self-reacting tooling according to the invention can comprise a first rotatable probe member having an internally disposed lengthwise passageway therethrough and having a first (or top) shoulder oriented in a first direction; a second rotatable probe member fixed relative to the first probe member and having a second (or bottom) shoulder oriented in a second direction opposite the first shoulder, wherein the first and second shoulders are spaced to form a gap therebetween; and a split-pin coupled to both the first or second probe members and rotatable therewith and operable in the gap between first and second shoulders.

In a traditional self-reacting stirring tool the component which joins the top and bottom shoulders is a solid tube or cylinder. In the case of the self-reacting stirring tool with filler material according to embodiments of the invention, however, the "pin" which joins the upper and lower shoulder of the tool is split into two pieces to allow the flow of coating/filler material through the opening in the upper shoulder and into the volume between the upper and lower shoulders. FIG. 1C shows an exemplary split pin configuration schematically.

In preferred embodiments, the tool has a throat that is in the shape of a hollow cylinder and a screw-type auger is disposed in the tool throat for continuously delivering powder-type coating material in and through the throat of the tool body. Optionally, the tool can further comprise a sleeve, which is a tubular member disposed within the tool throat and within which the auger is disposed. The sleeve encompassing the auger is disposed in the throat of the tool and optionally the sleeve is attached to the tool body. During use, powder filler material is fed into the throat of the tool and by rotation of the auger the material is pushed through the tool throat.

Means for rotating the tool can be incorporated into the tooling and tooling systems of the invention. Means for rotating the tool body at a desired first velocity and for rotating the auger at desired second velocity is preferred. During use, the auger can be caused to rotate at a higher or lower velocity than the tool body. Means for causing translational movement of the tool body relative to the substrate can also be included.

Figure 3:
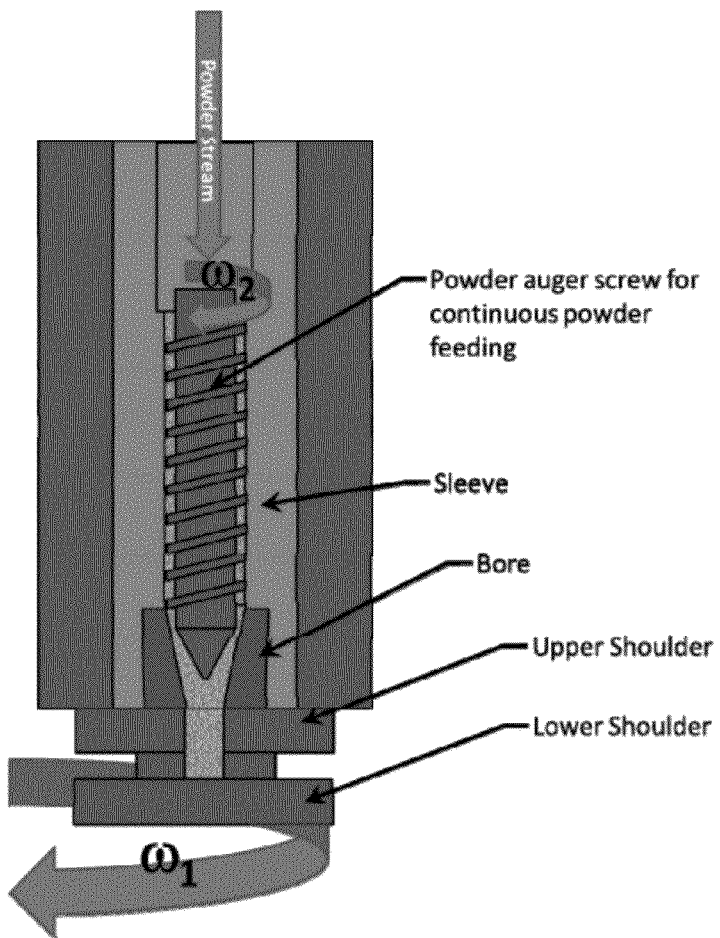
FIG. 3 is a schematic diagram of a self-reacting type continuous feeding Friction Stir Fabrication (FSF) system.

In preferred embodiments, the self reacting stirring tool is designed to work with powder filler. A representative continuous feeding type of self-reacting stirring tool that can be used with consumable filler material in powder form is shown in FIG. 3. Typically, the self-reacting friction stir tooling can comprise any one or more of the following characteristics, including a non-consumable tool body with a throat and upper and lower shoulder surfaces disposed at a fixed distance with their surfaces facing one another; a screw-type auger disposed in the throat with means for continuously delivering powder-type filler material through the throat of the tool body; one or more means for rotating the tool body at a desired first velocity and for rotating the auger at desired second velocity.

Welding methods according to embodiments of the invention can comprise: depositing filler material on and/or between adjacent surfaces of substrates using continuous powder-fed friction stir fabrication tooling, wherein during depositing, flow rate of power filler material is capable of being adjusted in response to variations in substrate thickness and/or the gap between substrates. For example, as the self-reacting tool traverses the surface of the substrate during the welding process, the upper and lower shoulder of the tool (the upper shoulder being the surface of the tool that faces the top surface of the substrate and the lower shoulder being the surface of the tool that faces the bottom surface of the substrate) remain at a fixed distance apart from one another. The substrate is disposed between the shoulder surfaces and may have variations in thickness along the length of the substrate. As the tool encounters an area of the substrate that is thinner, more filler material can be introduced to the void between the shoulder and substrate to account for this deviation in thickness. Likewise, as the tool encounters an area of the substrate that has an increased thickness, the feeding mechanism of the tool can react by causing less filler material to be disposed on the substrate. In alternative embodiments, the self-reacting tool can have moveable shoulders, meaning the shoulders are capable of moving relative to one another.

Adjustments to the flow rate of the powder filler material can be accomplished manually or automatically. If manual, the filler material can be controlled by a valve that can be opened or closed manually to allow for more or less filler material to be disposed on the substrate as desired. In an automated system, the tooling can be in operable communication with a powder delivery system for continuously delivering powder filler material to the tool; and a control system for operating the tooling and powder delivery system can be used in a manner that dispenses varying amounts of filler material into the throat in response to variations in thickness of the substrate. In preferred embodiments, the welding system can comprise a thickness gauge. If the system detects a decrease in thickness (indicating a thinner substrate), then more filler material can be fed through the tool at that location on the substrate, and if the system detects an increase in thickness (indicating a thicker substrate), then the flow rate of the filler material can be decreased accordingly. Ideally, such a system will react to variations in substrate thickness by controlling the amount of filler material to be deposited at a particular location along the substrate in order to maintain the pressure of the system within a desired operating range.

For example, a self-reacting stirring tool with the capabilty to add filler material can be used to weld two 5083 aluminum plates. The rotating stirring tool translates into the weld joint edge instead of the typical plunge into the joint with traditional friction stir welding. Once the split pin is engaged into the joint, 5083 Al filler material is feed into the tool to fill in any gap that resides between the plates or make up for height variations in the plates. The amount of filler material added is equal to or greater to the volume of materaial required fill any gaps, depressions, or otherwise voided areas. The stirring tool exits the joint by translating out of the far edge of the joint.

Figure 4:
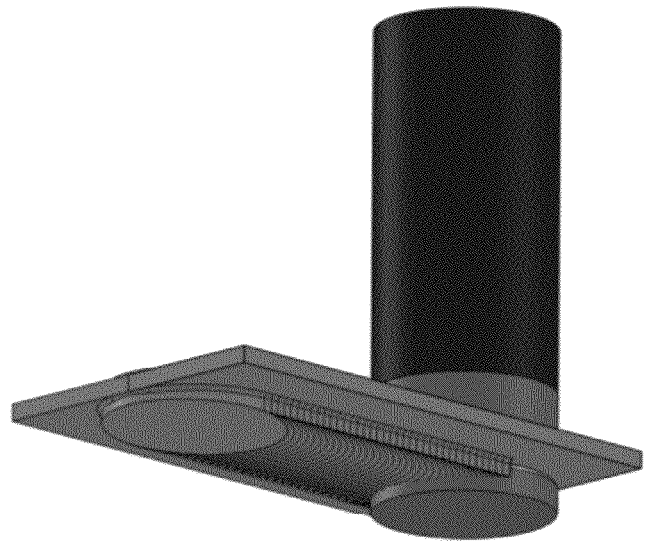
FIG. 4 is a schematic diagram showing representative self reacting friction stir tooling, which can be used to increase weld thickness above that of the base plate.

More particularly, as shown in FIG. 1B, the bottom and top shoulders can be connected by fixed split-pin to hold the two shoulders at fixed spacing and allow material to flow into the nugget. Another advantage of the self-reacting stirring tool with filler material is the ability to increase the weld joint thickness above the base plate thickness. This is demonstrated in the schematic diagram provided by FIG. 4.

Embodiments of metal deposition methods according to the invention may significantly reduce labor and time requirements for preparing substrates. For example, the coating material may be delivered to the substrate surface using a "push" method, where a rotating-plunging tool, e.g., auger, pushes the filler material through the rotating tool, such as a spindle. Feed material can be introduced to the tool in various ways, including by providing an infinite amount of powder filler material into the tool body from a refillable container in operable communication with the tool.

In preferred embodiments, the filler material is a powdered solid and is fed through the tool body using an auger shaped plunging tool (e.g., a threaded member). In such an embodiment, the plunging tool may or may not be designed to move or "plunge" in a direction toward the substrate. For example, the threaded configuration of the auger itself is capable of providing sufficient force on the powdered feed material to direct the consumable toward the substrate for deposition, however, in embodiments vertical movement of the auger relative to the tool can also be used. It may be desired in some circumstances to control whether vertical movement of the auger will be used and to what extent during different phases of a coating process.

As the spindle and plunging tool rotate, compressive loading and frictional heating of the filler material can be performed by pressing the coating material into the substrate surface with the downward force (force toward substrate) and rotating speed of the plunging tool.

During the deposition process, it is preferred that the spindle rotate at a slightly slower rate than the auger or plunging tool. Alternatively, in embodiments, the spindle can also be caused to rotate faster than the auger. What is important is that the spindle and auger rotate at different velocities, such that there is relative rotation between the spindle and the auger during deposition of the coating material. Due to the difference in rotational velocities, the threaded portion of the auger provides means for pushing the consumable material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it may be desired in some applications to alter the rotational velocity of the tool body and/or auger during deposition of the coating material.

Deposition rate of the filler material on the substrate can be adjusted by varying parameters such as the difference in rotational velocity between the auger screw and the spindle, or modifying the pitch of the threads on the auger. If desired, for particular applications it may be warranted to control filler material temperature inside or outside of the tool body. Such thermally induced softening of the filler material provides means to increase deposition rates to meet application requirements.

The present invention provides embodiments of a highly scalable process for the repair of large-scale aluminum (or other base metal) structures based on friction stir fabrication (FSF) processes having the ability to add material through the spindle of the tooling. By adding filler material during welding, irregularities in the fit-up and plate thickness can be accommodated. The additive nature of the FSF process, which is coupled with the ability of friction-stir technologies to effectively reprocess/refine microstructures, provides an ideal repair method for a wide range of Al superstructure repair options.

Self-reacting friction stir welding according to embodiments of the invention can include tooling and/or automated systems (such as computer assisted design (CAD) systems) comprising: a) self-reacting friction stir tooling and a fluidized powder delivery system in operable communication with the tooling; b) means for controlling (ie, control system) one or more functions of the tooling and/or powder delivery system (such as rotational velocity of the tool body, rotational velocity of the auger, translational velocity of the tool, composition and flow rate of the powder into the tooling and/or three-dimensional positioning of the tooling relative to the substrate); c) software for providing instructions (whether previously programmed or comprising the capability to deliver real-time instructions) to the control system for the tooling regarding, eg, rotational and/or translational speed, three-dimensional positioning of the tooling relative to the substrate, and/or composition and/or flow rate of the consumable powder material being deposited on the substrate.

Preferred embodiments of the systems, methods and tooling according to the invention include tooling operably configured for continuously feeding powdered materials through a friction stir fabrication or friction stir welding spindle.

In particular, powdered materials can be feed into the top of the spindle using a fluidized powder delivery system. Any type of powder delivery system can be used in connection with the tools and systems of the present invention. For example, a gravity-fed powder feeder system can be used, such as a hopper. One such feed system is the Palmer P-Series Volumetric Powder Feeder from Palmer Manufacturing of Springfield Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder coating material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

Feeding multiple powders into the spindle will allow for creation of MMCs and alloys. MMC (metal-matrix composite) coatings can be formed in the same manner as a wrought coating, including by having the matrix alloy and the reinforcement feed through the spindle. However, the MMC consumable feed materials can be made by several methods, including but not limited to mixing the matrix metal and reinforcement powders as feed material, and in some cases mixing of the matrix and reinforcement further during the fabrication process.

In embodiments, a mix of powder types can be added to the hopper which is operably connected with the stir tool. Alternatively, several different types of powder can be added individually to the hopper, then mixed within the hopper and dispensed as a mixture to the friction stir tool during use. For example a metal powder and ceramic powder could be fed into the spindle at the same time, from the same or separate hoppers, and upon consolidation/deposition the coating would be a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. Titanium aluminides such as TiAl and nickel aluminides such as $Ni_3Al$ may be provided as the discontinuous phase. The metal matrix may typically comprise Al, Cu, Ni, Mg, Ti, Fe and the like.

Likewise, a first type of powder can be added to the hopper, dispensed through the tool, and applied to the surface of a substrate in a desired manner. Then, to produce a graded coating, a different type of powder can be added to the hopper, dispensed through the tool and applied to the substrate to provide a second layer of a different metal composition. This process can be repeated any number of times to form the graded coating by successive addition of any number of various material compositions.

Especially preferred for continuous feed self-reacting friction stir tools according to the invention are tools and systems which comprise an auger screw to force powder through the spindle at a defined rate. Disposed within the tool body can be an auger. In the context of this specification, the terms "auger," "screw," and "plunger" may be used to refer to a component of the tool that is disposed within the tool throat for pushing or pulling material through the throat. Also within this specification, the auger can be considered a component of the friction stir tool body. The auger can have the general shape of a screw with threads, as shown in FIG. 3, or can be shaped in a spiral configuration similar to a spring. When disposed within the tool throat, there may be clearance between the auger and the inside surface of the tool throat to allow for the passage of feed material between the auger and the throat. In other embodiments, there is only enough space to allow for rotation of the auger without interference from the surface of the throat. Preferably, the auger and tool body or spindle are not attached to one another. Each is operably connected with means for rotating and translating the components relative to a substrate surface, such that the auger and tool can rotate at different speeds but translate relative to the substrate at the same speed. It is preferred to keep the auger disposed within the tool throat in a manner such that there is no relative translational movement between the auger and tool body.

In this manner, consumable coating material can be continuously delivered to the tool body and/or continuously deposited on the substrate surface and/or its composition modified while the process continues. Such an embodiment is particularly useful for delivering coating material in powder form, however, other equally applicable configurations are also available for other types of rod stock.

As the spindle is spinning at a desired rotational velocity, the auger screw is driven at a different rotational speed in the same rotational direction to force material out. Powdered materials can be feed into the top of the spindle using a fluidized powder delivery system. Feeding multiple powders into the spindle will allow for creation of MMCs and alloys.

Embodiments of the invention provide a self-reacting friction stir welding system comprising: friction fabrication tooling having a non-consumable body with a throat and upper and lower shoulder surfaces disposed at a fixed distance with their surfaces facing one another; and a fluidized powder delivery system in operable communication therewith, wherein the powder delivery system is operably configured for continuously delivering a coating material into and through the tooling.

Such systems can be operably configured for automatically dispensing varying amounts of filler material into the tooling in response to variations in thickness of a substrate being processed. Additionally, the systems can comprise a thickness gauge for determining substrate thickness and a control system for varying the amount of filler material dispensed in response to detection of a pressure above or below a set pressure threshold.

The tool body and auger of continuous feeding self-reacting type friction stir tools and systems of the invention can be operably configured in multiple ways to achieve the functional results described in this specification. Below are some of the features and their related design tasks which can be incorporated into the spindle.

Auger Screw Design

Figure 5A:
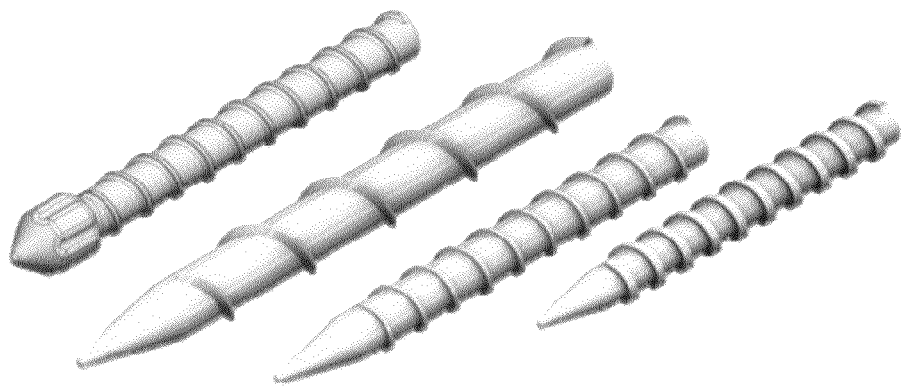
FIG. 5A is a schematic diagram illustrating representative configurations for augers of embodiments of continuous feed friction stir tools of the present invention.
Figure 5B:
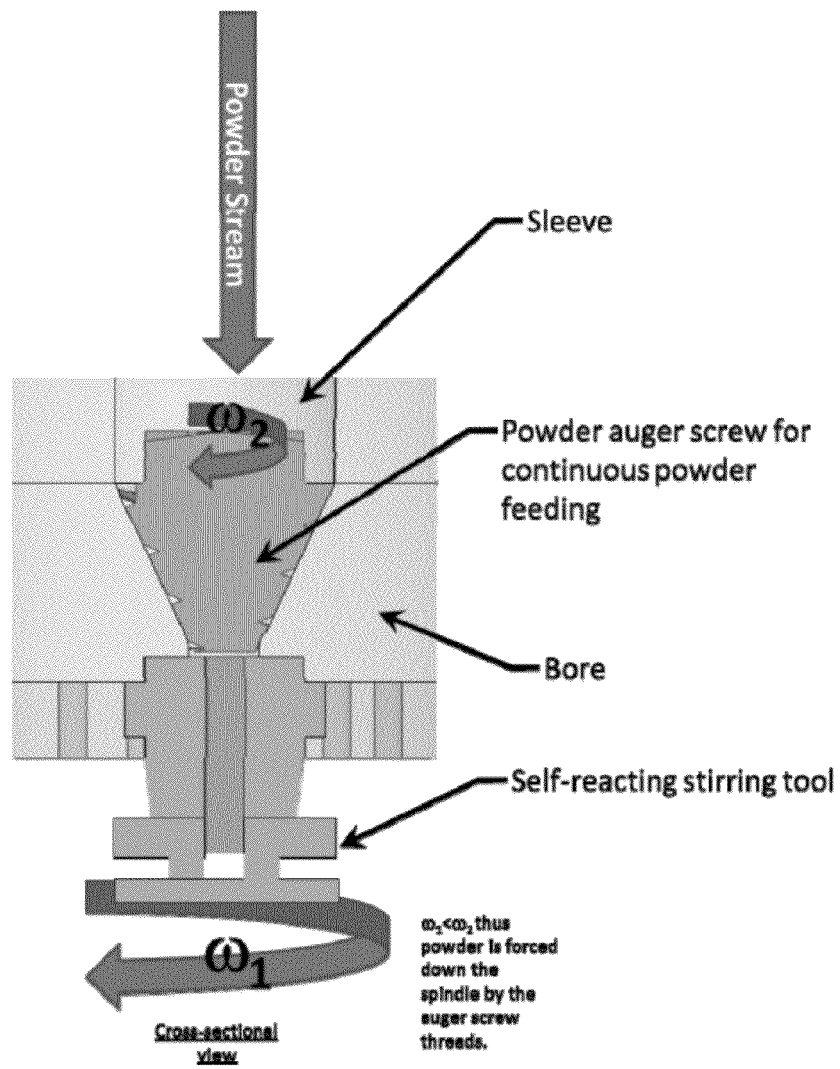
FIG. 5B is a schematic diagram of a continuous feeding self-reacting friction stir tool according to the invention comprising a conical shaped auger for continuously delivering powder form coating material.

For material to be forced through the spindle the auger screw should be designed in such a way that pressure is exerted on the powder by the screw. A significant amount of design knowledge exists in the metal powder injection molding and extrusion literature. Polymer screw designs, e.g., can be found at: http://www.spirex.com/media/doc/The%20Basics%20 of%20Good%20Extrusion%20Screw%20Design.pdf, which is hereby incorporated by reference herein in its entirety, and includes the Xaloy brand extrusion screw, such as the Efficient Screw or the Fusion Screw. Additional auger screw embodiments are illustrated in FIG. 5A, which generally include a main screw portion having threading along the length of the screw. The threaded portion can be of any configuration, including thin threads disposed close to one another or thick threads spaced apart from one another or vice versa. Even further, a powder auger screw as shown in FIG. 5B may also be used in embodiments. The filler material in powder form can be fed into the interior of the conical shaped auger and forced toward the throat of the stirring tool. In embodiments, a twin screw design can also be used where two screws cooperate together to push the feeder material through the tool throat. The design features of particular interest are the amount of pressure generated on the powder at the tool throat and the rate at which powder is fed from the screw (e.g., auger) per revolution or the volumetric pitch. The absolute rate at which powder is fed through the spindle will depend on the volumetric pitch and the difference between the rotational velocities of the spindle and auger screw.

Sleeve Design

The powder feeding system can comprise an auger screw and housing or bore, preferably modular components, capable of insertion into the throat of the spindle. Both the screw and bore will likely wear with use and need to be replaced periodically and as such it may be desired that they not be permanently joined to the spindle. One embodiment provides for the screw and bore to be mounted into a sleeve that will be keyed into the spindle and fastened into place. During use, the powder feed material can be dispensed into the bore within which the auger is disposed. Feed material is then pushed through the bore to be dispensed on the substrate without coming into contact with the throat of the tool body.

The sleeve, as shown for example in FIG. 3, occupies the volume between the spindle inner diameter and the auger screw and may also be keyed into the spindle and/or stirring tool. The sleeve provides mounting locations for support bearing for the auger screw as well as a mounting location for the bore. The bore is in contact with some or all of the auger major diameter. The bore can be a comprised of a different more wear resistant material than the sleeve as rubbing of the auger and feed powder wears the bore.

Bore Design

The bore can be operably configured to accommodate bearings on one or both the powder feed side and spindle to keep the screw from whipping or becoming off-center. Proper selection of these bearings and the manner in which they are housed will be a key to the long term success of the material feeding design.

Powder Feeding/Metering System

Powder filler material can be fed into the top of the rotating spindle by a fluidized powder dispensing system which can continuously and accurately dispense powder. In preferred embodiments, two or more separate dispensing systems can be installed so that multiple powders can be independently introduced to the system allowing for continuous variation of composition. Employing a fluidized feeding will allow for feeding powders of widely different particle sizes and shapes.

Of particular interest are the production of substrates comprising one or more of: multi-material parts, wrought microstructure, full density (low porosity), layer-to-layer bond strength comparable to base metal UTS, the joining of parts, wrought mechanical and physical properties, and/or by a method that is not contamination prone.

As shown in FIG. 6, a benefit of the self-reacting tooling designs of the invention is that the tooling can be used for applications in which using a backing plate may not be practical. Traditional friction stir processes (on the left of FIG. 6) require a backing plate to stop deformation of the workpiece due to the vertical (plunge load). The backing plate typically supports the entire width of the workpieces being joined or repaired. Self reacting friction stir processes (on the right of FIG. 6) do not require a backing plate because of the opposing shoulders on either side of the work piece. Using the self-reacting tooling of the invention there is a net zero force on the workpiece in the vertical direction.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. Where a range of values is provided in this specification, each value between the upper and lower limits of that range is also specifically disclosed. The upper and lower limits of these smaller ranges may independently be included or excluded in the range as well. As used in this specification, the singular forms "a," "an," and "the" include plural referents unless the context clearly dictates otherwise. It is intended that the specification and examples be considered as exemplary in nature and that variations that do not depart from the essence of the invention are intended to be within the scope of the invention. Further, the references cited in this disclosure are incorporated by reference herein in their entireties.

The invention claimed is:

1. Self-reacting friction stir welding tooling comprising:
   friction fabrication tooling having a non-consumable body with a throat for feeding filler material into a weld joint and upper and lower shoulders disposed at a fixed distance with their surfaces facing one another;
   wherein the upper shoulder surface and the lower shoulder surface are capable of trapping filler material loaded into substrates in a volume between the tool shoulders and are capable joining the substrates with frictional heating and compressive/shear loading; and wherein the upper and lower shoulders are connected by a fixed split-pin.

2. The tool of claim 1, wherein the tool throat is a hollow cylinder.

3. The tool of claim 1, further comprising a screw-type auger disposed in the tool throat for continuously delivering powder-type coating material in and through the throat of the tool body.

4. The tool of claim 3 further comprising a sleeve, which is a tubular member disposed within the tool throat and within which the auger is disposed.

5. The tool of claim 1, further comprising one or more means for rotating the tool body at a desired first velocity and for rotating an auger at a desired second velocity.

6. The tool of claim 1 comprising means for causing translational movement of the tool body relative to the substrates.

7. A self-reacting friction stir welding system comprising:
   friction fabrication tooling having a non-consumable body with a throat for feeding filler material into a weld joint and upper and lower shoulders disposed at a fixed distance with their surfaces facing one another;
   a fluidized powder delivery system in operable communication therewith, wherein the powder delivery system is operably configured for continuously delivering a coating material into and through the tooling.

8. The system of claim 7, wherein the powder delivery system is operably configured for automatically dispensing varying amounts of filler material into the tooling in response to variations in thickness of a substrate being processed.

9. The system of claim 8, further comprising a thickness gauge for determining substrate thickness and a control system for varying the amount of filler material dispensed in response to detection of a pressure above or below a set pressure threshold.

10. The tool of claim 7, wherein the upper and lower shoulder surfaces are connected by a fixed split-pin.

11. The tool of claim 10, wherein the tool throat is a hollow cylinder.

12. The tool of claim 11, further comprising a screw-type auger disposed in the tool throat for continuously delivering powder-type coating material in and through the throat of the tool body.

* * * * *